United States Patent Office 3,433,832
Patented Mar. 18, 1969

3,433,832
RECOVERY OF α-AMINOCARBOXYLIC ACIDS FROM SODIUM CHLORIDE SOLUTIONS
Norman Swanson, Freeport, Richard O. Kirk, Lake Jackson, and George E. Woodward, Freeport, Tex., assignors to The Dow Chemical Company, Midland, Mich., a corporation of Delaware
No Drawing. Filed Dec. 3, 1965, Ser. No. 511,307
U.S. Cl. 260—534
Int. Cl. C07c 99/12
5 Claims

ABSTRACT OF THE DISCLOSURE

Recovery of α-aminocarboxylic acids from aqueous sodium chloride solutions is improved by prior removal of sodium chloride through preferential crystallization at 85–120° C. from a concentrated solution adjusted to about the isoelectric point of the amino acid. The process is particularly suitable for recovery of amino acid such as methionine from a caustic hydrolyzate liquor neutralized with hydrochloric acid.

---

In the synthesis of α-aminocarboxylic acids, alkaline solutions of an amino acid salt are often encountered. Thus, in preparing methionine by hydrolysis of 5-(β-methylmercaptoethyl)hydantoin with sodium hydroxide as described by White in U.S. Patent 2,557,920, the hydrolyzate liquor is an aqueous solution containing sodium methionate, sodium carbonate and excess sodium hydroxide. Neutralization of the hydrolyzate liquor with hydrochloric acid to about the isoelectric point precipitates a portion of the methionine, but a significant amount remains dissolved in the aqueous mother liquor.

Other amino acids including isoleucine, leucine, phenylalanine, tryptophane and valine can be prepared by a similar hydantoin synthesis. However, the problem of separating sodium chloride and a water-soluble amino acid is not limited to neutralized hydrolyzate liquors. It occurs in other processes.

Recovery of a dissolved amino acid such as methionine from an aqueous salt solution by concentration to dryness and extraction with anhydrous ethanol or other suitable extractant is not commercially feasible. Ion-exchange techniques, such as described by White in U.S. Patent 2,700,054, are capable of isolating free amino acids in high purity and yield from hydrolyzate liquors and other aqueous alkaline solutions. However, the ion-exchange process is costly in terms of special equipment, resin and labor. Therefore an alternate process adaptable for simple, rapid and flexible operation and particularly suitable for the recovery of methionine was sought.

It has now been discovered that a rapid separation of an amino acid from a relatively large amount of sodium chloride in aqueous solution can be achieved by preferential crystallization of the sodium chloride at 85°–120° C. This process can be effectively used in the recovery of an amino acid, which has (a) a solubility of at least 0.7 parts per 100 parts by weight water at 25° C. but less than 35.0 parts per 100 parts by weight water at 100° C. and (b) a ratio of water solubility at 100° C. to that at 25° C. of at least 2.5, from an aqueous solution containing at least one mole of sodium chloride per mole of amino acid by concentrating the solution at about the isoelectric point of the acid to obtain a slurry at 85°–120° C. of precipitated sodium chloride and an aqueous solution enriched in the amino acid, filtering at 85°–120° C. to remove the precipitated sodium chloride and then cooling the filtrate to recover the amino acid.

This new process is particularly suitable for the recovery of methionine from an alkaline hydantoin hydrolyzate. As applied to the recovery of methionine from such a hydrolyzate, the improved process comprises: (1) neutralizing the hydrolyzate with HCl to a pH of about 4.0–7.0; (2) filtering the neutralized hydrolyzate at about 20°–30° C. to recover the precipitated methionine; (3) concentrating that mother liquor to obtain at 85°–120° C. a slurry of precipitated sodium chloride and an aqueous solution enriched in methionine; (4) filtering the slurry at 85°–120° C. to remove the precipitated sodium chloride; and (5) cooling the aqueous filtrate enriched in methionine to precipitate and recover additional methionine.

However, it is not limited to such hydrolyzate solutions. It is generally applicable to aqueous sodium chloride solutions containing a dissolved amino acid having the requisite solubility characteristics. Solubility data for sodium chloride and a number of protein amino acids which meet these requirements are given in Table 1.

TABLE 1.—SOLUBILITY DATA

| Solute | Isoelectric point, pH | Solubility (g./100 g. H₂O) | | Solubility ratio 100°/25° |
|---|---|---|---|---|
| | | 25° C. | 100° C. | |
| Sodium chloride | | 36.1 | 39.8 | 1.1 |
| dl—Aspartic acid | 2.8 | 0.78 | 8.6 | 11.0 |
| dl—Glutamic acid | 3.2 | 2.0 | 28.5 | 14.3 |
| dl—Isoleucine | 6.0 | 2.5 | 7.8 | 3.1 |
| dl—Leucine | 6.0 | 1.0 | 4.2 | 4.2 |
| dl—Methionine | 5.7 | 3.3 | 17.8 | 5.4 |
| dl—Phenylalanine | 5.5 | 1.4 | 6.7 | 4.8 |
| dl—Serine | 5.7 | 1.5 | 32.2 | 21.5 |
| dl—Tryptophan | 5.9 | 0.9 | 5.0 | 5.5 |
| dl—Valine | 6.0 | 7.0 | 18.8 | 2.7 |

The present process is based primarily on the different effect of temperature on the water solubility of the amino acids and sodium chloride. As shown in Table 1, the water solubility of the amino acids increases markedly with increasing temperature while that of sodium chloride remains relatively constant in the range from 25°–100° C. This factor is reflected in the requirement that the amino acid solubility ratio (parts at 100° C./parts at 25° C.) be at least 2.5. The further limitations of a minimum solubility of 0.7 part per hundred at 25° C. and a maximum of 35.0 parts per hundred at 100° C. are based on practical operating considerations. More soluble amino acids such as alanine or glycine, cannot be effectively recovered by crystallization from aqueous solution at 20°–30° C.

A further process limitation for maximum recovery of the amino acid on crystallization is that the aqueous solution be neutralized to about the isoelectric point. As shown in Table 1, the isoelectric point for α-aminomonocarboxylic acids generally falls between pH 5.5–6.1. In practice it has been found that a pH of about 4.0–7.0 is suitable for the crystallization of methionine and other α-aminomonocarboxylic acids. With a dicarboxylic amino acid such as aspartic or glutamic acid, a pH of about 1.5–4.5 is desirable for best recovery.

Within the general scope of this invention, optimum process conditions for the preferential crystallization of sodium chloride can be determined in routine manner. Separation of the precipitated sodium chloride from the enriched amino acid solution at 85°–120° C. can be achieved by filtration or centrifugation. Then to remove small amounts of amino acid adhering to the precipitated salt, it is often desirable to rinse the salt with a small amount of a hot aqueous solution saturated with NaCl. Often a portion of the mother liquor from a previous amino acid crystallization can be effectively used for this purpose.

To illustrate the present invention further, the following examples are given. Unless otherwise stated all parts and percentages are by weight.

EXAMPLE 1

An aqueous solution obtained by the hydrolysis of 5-($\beta$-methylmercaptoethyl)hydantoin with aqueous sodium hydroxide as described by White in U.S. Patent 2,557,920 and about 1 N in sodium methionate, 1 M in $Na_2CO_3$, and 0.5 N in NaOH, was acidified to pH 3.0 with hydrochloric acid. When the evolution of $CO_2$ subsided, the pH was adjusted to about 6.0 and the precipitated methionine was recovered by filtration. The recovered methionine, rinsed with water and dried, had a purity of 99+% with a yield of about 86%.

The combined aqueous filtrate (F-1) containing about 2% methionine and 14% NaCl was then concentrated at 100°–107° C. until a slurry of precipitated NaCl and an aqueous solution containing about 18% methionine and 27% NaCl was obtained. The slurry was filtered at 100°–105° C. and the recovered precipitated NaCl washed with a small heated portion of the original filtrate containing 2% methionine and 14% NaCl. The combined filtrate enriched in methionine (F-2) was cooled to 20°–30° C. and a second crop of methionine precipitated. A wet filter cake containing 60–70% methionine and 30–40% NaCl on a total solids basis was recovered. Washing at 20°–30° C. with a saturated aqueous methionine solution effectively removed the NaCl to give 95–98% pure methionine.

Overall, the modified process has given a minimum 95–98% recovery of methionine with a purity of 97% or better. Further the aqueous filtrate (F-3) from the second crystallization can be recycled to the evaporator after appropriate treatment to prevent the accumulation of undesired soluble impurities. This can be accomplished by discarding a portion of the recycle filtrate. The loss of methionine in the discharded side stream can be reduced by separate concentration and recovery of further crude methionine for recycle to the main process stream.

In a similar manner the preferential crystallization of NaCl at 85°–120° C. can be advantageously employed in the recovery of isoleucine, leucine, phenylalanine, tryptophane and valine from caustic hydrantoin hydrolyzate liquors neutralized with HCl.

EXAMPLE 2

A methionine hydrolyzate liquor containing about 10% sodium methionate was neutralized with HCl. Filtration at 30° C. gave an 80% recovery of methionine and a mother liquor (F-1) containing 2.8% methionine and 17.2% NaCl. Concentration of the mother liquor at 100–110° C. gave a slurry of NaCl in a saturated methionine solution which was filtered hot to remove the precipitated NaCl. Subsequent cooling of the filtrate (F-2) to 20°–30° C. gave a second crop of methionine. A small portion of the filtrate from the second crop of methionine (F-3) was discarded and the balance recycled with additional hydrolyzate liquor. After 5 cycles, the overall yield of recovered methionine was 95.6%. The dried product had a minimum purity of 98.8% with about 0.08% of the corresponding $\alpha$-hydroxycarboxylic acid, 0.89% NaCl and 0.10% water as major impurities.

We claim:

1. A process for the recovery of an $\alpha$-aminocarboxylic acid, which has (a) a solubility of at least 0.7 part per 100 parts by weight water at 25° C. but less than 35.0 parts per 100 parts by weight water at 100° C. and (b) a ratio of water solubility at 100° C. to that at 25° C. of at least 2.5, from an aqueous solution containing at least one mole of sodium chloride per mole of said amino acid which comprises concentrating the solution at about the isoelectric point of the amino acid to obtain a slurry at 85°–120° C. of precipitated sodium chloride and an aqueous solution enriched in the amino acid, filtering the slurry at 85°–120° C. to remove the precipitated sodium chloride, and then cooling the aqueous filtrate to recover the amino acid.

2. The process of claim 1 wherein the aqueous solution containing the $\alpha$-aminocarboxylic acid and sodium chloride is obtained by neutralizing a caustic hydantoin hydrolyzate with hydrochloric acid.

3. The process of claim 2 wherein the $\alpha$-aminocarboxylic acid is a monocarboxylic acid and the hydrolyzate is neutralized to a pH of about 4.0–7.0.

4. The process of claim 3 wherein the $\alpha$-aminocarboxylic acid is methionine.

5. The process of claim 2 wherein methionine is recovered from a caustic hydantoin hydrolyzate by successively: (1) neutralizing the hydrolyzate with hydrochloric acid to a pH of about 4.0–7.0; (2) filtering the neutralized hydrolyzate at about 20°–30° C. to recover the precipitated methionine; (3) concentrating the mother liquor to obtain at 85°–120° C. a slurry of precipitated sodium chloride and an aqueous solution enriched in methionine; (4) filtering the slurry at 85°–120° C. to remove the precipitated sodium chloride; (5) washing the precipitated sodium chloride at 85°–120° C. with saturated aqueous sodium chloride to remove adhering methionine; and (6) cooling the combined aqueous filtrate to precipitate and recover additional methionine.

References Cited

UNITED STATES PATENTS

| | | | |
|---|---|---|---|
| 2,178,510 | 10/1939 | Gerber | 260—534 |
| 2,443,391 | 6/1948 | Kirkpatrick | 260—534 |
| 2,557,920 | 6/1951 | White | 260—326.14 |
| 2,700,054 | 1/1955 | White | 260—534 |

LORRAINE A. WEINBERGER, *Primary Examiner.*

ALBERT P. HALLUIN, *Assistant Examiner.*